JOHN W. PATTERSON
JOHN L. POOL
JOHN T. SNYDER
INVENTORS

JOHN W. PATTERSON
JOHN L. POOL
JOHN T. SNYDER
INVENTORS

BY James C. Fails
PATENT AGENT

# United States Patent Office 3,361,146
Patented Jan. 2, 1968

3,361,146
METHOD AND APPARATUS FOR CONTROLLING AN INTERMITTENTLY OPERATED FLOW LINE
John W. Patterson, Richardson, and John L. Pool and John T. Snyder, Dallas, Tex., assignors to Mobil Oil Corporation, a corporation of New York
Filed June 19, 1964, Ser. No. 376,337
12 Claims. (Cl. 137—8)

This invention relates to control of an intermittently operated flow line. The invention is particularly directed to control of intermittently operated, liquid-filled pipelines.

Pipelines are frequently used to transport petroleum from a storage facility on a lease to a distant delivery point. This generally requires a pump at the storage facility, a pipeline, and an accurate measuring facility at the delivery point.

The nature of such operations, i.e., the production of the petroleum, the accumulation in storage, the gauging, and the starting and stopping, either manually or automatically, of the pump, necessitates intermittent operation of the pipeline. If no controls are provided on the pipeline at the measuring facility, the petroleum tends to "bleed off" during periods of inoperation. "Bleed off" is a term used to denote the flow of the petroleum through the pipeline to a point of lower pressure potential, e.g., into a delivery storage tank. As a result, the pressure in the pipeline is reduced. Serious problems, such as the influx of air, can accompany extreme lowering of the pressure. Such extreme lowering is unusual, but even under the best conditions the bleed off is accompanied by dissolved gases coming out of solution in the petroleum and partially filling the pipeline. Such gases migrate to high points in the pipeline and create gas pockets. Upon subsequent operation of the pipeline, the trapped gases in the gas pockets are displaced as numerous slugs through the metering equipment and cause inaccurate measurement of the petroleum flowing through the pipeline.

A main line valve can be provided to control the flow in the pipeline and the valve will overcome the difficulties arising from the bleed off. However, such a valve will require at least a control means for opening and closing the valve. If the control means is based on flow of the petroleum in the pipeline, the control means becomes inoperable once the valve is closed. In addition, various factors may cause excessively high pressure within the pipeline from liquids trapped therein by valve closure. As an alternative to control means based on flow, the control means may be based on pressure. For example, a pressure relief valve responsive to upstream pressure can be provided in the pipeline to open at a preset pressure and prevent excessive pressure build up. This requires that delivery at the delivery point be made at the preset pressure, however, and increases the discharge pressure required at the pump.

Accordingly, it is an object of this invention to control an intermittently operated flow line and afford minimal discharge pressure on the pump moving the fluid through the flow line.

It is another object of the invention to maintain an intermittently operated flow line filled with the fluid whose flow is to be measured so as to minimize flow measurement errors.

It is another object of the invention to prevent excessive build up of pressure in a flow line.

In accordance with the invention, flow of fluid is controlled in an intermittently operated flow line having a normally closed main line valve therein by a procedure involving bypassing fluid around the main line valve when the upstream pressure of the fluid exceeds a preset maximum, measuring the rate of flow of the fluid through the flow line, and opening the main line valve only when the flow of fluid through the flow line exceeds a predetermined rate.

Further objects and attendant advantages of the invention will be apparent from the following detailed description taken in conjunction with the accompanying drawings in which.

Figure 1:
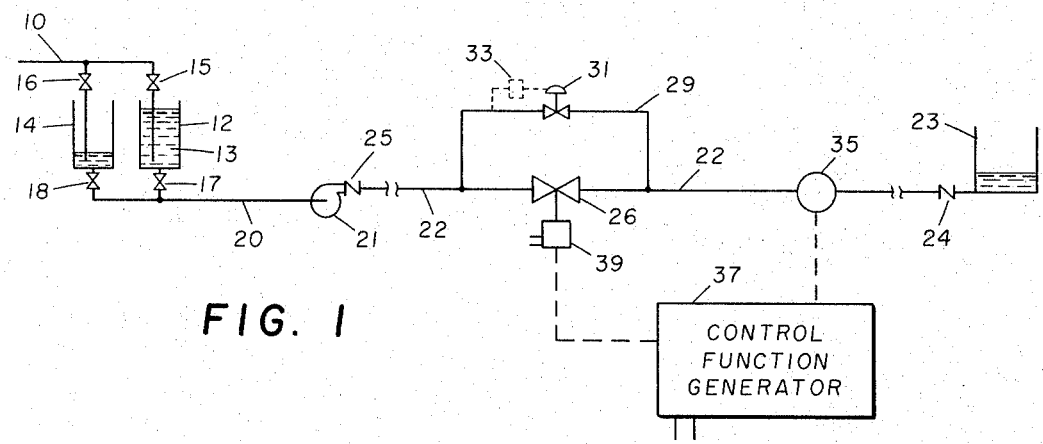
FIGURE 1 is a schematic diagram of a flow line and associated apparatus illustrating the invention.

Referring to FIGURE 1, a stream 10, which may be, for example, petroleum, hereinafter termed oil, from an oil well flows into storage tank 12. When storage tank 12 is filled to the desired level with oil 13, stream 10 is diverted into storage tank 14 by closing valve 15 and opening valve 16. Drainage valve 17 on storage tank 12 is opened, while drainage valve 18 remains closed. The oil from storage tank 12 thus flows into suction line 20 leading to pump 21. Pump 21 is started to pump the oil from the storage tank 12 through flow line 22 to a delivery point, such as storage tank 23. Suitable check valves 24 and 25 may be provided in line 22 to prevent backflow. When storage tank 12 has been emptied of its content of oil, operation of pump 21 is stopped and drainage valve 17 is closed. The operation of the valves and the starting and stopping of the pump to move the oil from its storage tank to the delivery point may be done manually by a gauger or automatically by liquid level controllers.

Between pump 21 and the delivery point shown as storage tank 23, preferably at the measuring facility, there is provided a system for control of the flow of fluid in flow line 22, i.e., the main flow conduit or pipeline. This system insures that the flow line remains full of liquid, yet does not experience excessively high pressure as by thermal expansion of the trapped liquid. As part of the system, main line valve 26 is installed in flow line 22. With main line valve 26 closed, flow through flow line 22 is prevented. Thus, flow line 22 is maintained full of liquid upstream from the valve and bleed off from this portion of the line is prevented. Bypass conduit 29 is provided around the main line valve 26 and in communication with flow line 22. Pressure relief valve 31 is provided in the bypass conduit 29.

Pressure relief valve 31 is installed in a manner well known to the art to operate in response to pressure in flow line 22 on the upstream side of main line valve 26. For example, basically, the pressure relief valve 31 may comprise a valve stem held by a spring in a closed position against a valve seat in opposition to the pressure exerted by the fluid in the flow line. When the pressure becomes great enough, the fluid forces the valve stem open and flows through the pressure relief valve, through the bypass conduit, and re-enters the main flow conduit, i.e., flow line 22. Alternatively, pressure relief valve 31 may be a back-pressure valve operated by signal from pressure pilot 33, described hereinafter.

The fluid from flow line 22 that is bypassed through pressure relief valve 31 is measured by meter 35 which is provided in flow line 22. It is desirable to use a low pressure meter installed downstream of pressure relief valve 31 where practical. It may be necessary to use a high pressure meter installed in flow line 22 upstream of pressure relief valve 31 with certain liquids having volatile gases absorbed therein. Otherwise, gas coming out of solution at reduced pressure may cause inaccurate measurements to be made. Meter 35 should be one which provides an output function indicative of the quantity of flow of fluid therethrough. The meter may be, for example, a positive displacement meter wherein electrical contacts are closed when a unit volume of fluid has passed therethrough. In such a meter, a rotating measuring chamber may operate a gear train which causes contact closure and registers cumulative volume on a dial. The closing of the contacts may be used in conjunction with a voltage source to generate an output function representative of the flow of fluid through the meter 35. Any other measuring facility affording an output function representative of the flow or rate of flow of fluids therethrough can also be used.

The output function from meter 35 is fed to and is monitored by control function generator 37. When the flow of fluid through flow line 22 exceeds a preset minimum rate, the control function generator generates a control function. When the flow of fluid through flow line 22 is less than the preset minimum, the control function generator generates a reverse control function.

Controller 39 is connected to and is responsive to the output of the control function generator 37. The controller 39 opens the main line valve 26 in response to a control function. Conversely, it closes main line valve 26 in response to a reverse control function.

Once the preset minimum rate of flow has been attained through meter 35 and controller 39 has opened main line valve 26, the delivery pressure against which pump 21 is required to deliver the fluid is reduced. With the lower pressure within the flow line, pressure relief valve 31 closes. However, the control function generator 37 continues to monitor the rate of flow in line 22 and to generate the control function as long as the rate of flow exceeds the preset minimum. Hence, main line valve 26 remains open continuously during periods of pump operation.

When the operation of the pump is stopped, e.g., upon the emptying of storage tank 12, main line valve 26 is closed and remains closed until a control function is generated. When main line valve 26 is closed, there may be an increase in pressure in flow line 22 due to the dynamic fluid effects such as the inertia of the fluid in the flow line and the hydraulic head due to differences in elevation, in addition to the thermal expansion previously mentioned. If the pressure in the flow line reaches the preset maximum, pressure relief valve 31 will open to bypass fluid until the pressure is restored to the preset maximum or below. The flow entailed by such bypassing of fluid is generally below the rate at which control function generator 37 will generate the control function and, hence, controller 39 will not open main line valve 26 in response to such low rates of flow. In the absence of any flow of fluid through meter 35, no output function is generated. In this circumstance, the control function generator and the controller remain inactive and the main line valve remains closed.

In general operations, if the output function from meter 35 in the foregoing description is representative of quantity of fluid flowing through the meter, the control function generator 37 will incorporate a monitor, such as a counter to measure the scalar magnitude of the output function; a timer; a comparator; and a reset means. The comparator will operate to compare the output from the monitor measuring the scalar magnitude of the output function from meter 35 against the output from the timer timing out a preset timing interval and obtain the rate of flow. Thus, the control function generator cyclically and repetitively determines the rate of flow and generates a control function or reverse control function. Under such cyclical operation, the generation of either a control function or a reverse control function triggers a reset means which is connected to the comparator. The reset means stops and resets both the monitor, i.e., the counter, and the timer.

Figure 2:
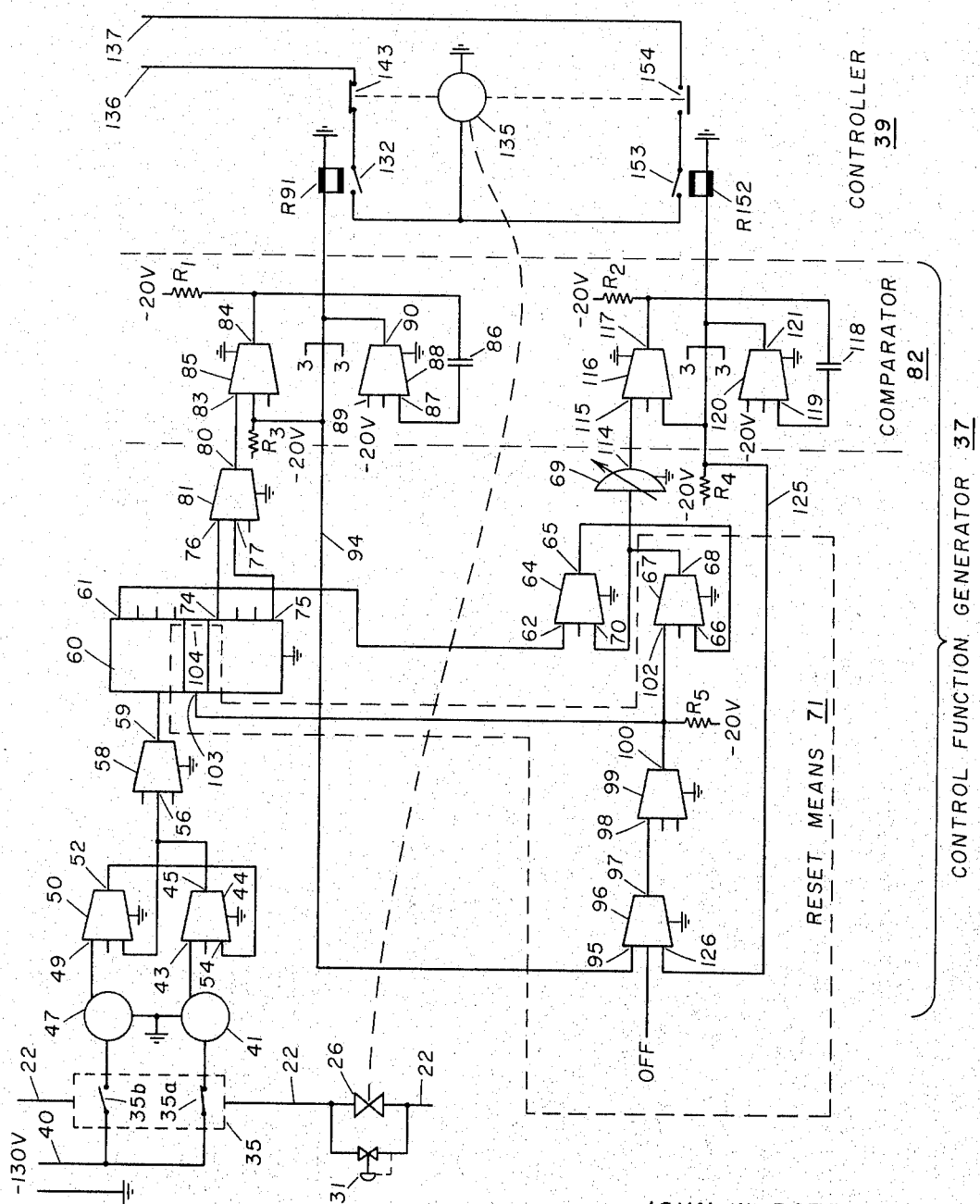
FIGURE 2 is a detailed schematic diagram of one embodiment of a system which may be employed in the practice of the invention.

In a specific embodiment illustrating such general operations, solid state electronic components are particularly useful in providing trouble-free operation where electrical power is available. The schematic of this specific embodiment is shown in FIGURE 2. Therein, the fluid flowing in flow line 22 is a liquid and flow line 22 is a pipeline. Meter 35 is a positive displacement meter having a double set of contacts thereon, one set alternating with the other and operative to close when a unit volume of fluid has flowed through the meter. The respective closings of the contacts are counted by a decade counter. A comparator circuit is used to compare the output of the decade counter against the output of a timer. A reset means is used to reset both the decade counter and the timer in the event either of them runs out before the other. When the decade counter counts out before the timer times out, the comparator sends a control function to the controller which opens the main line valve in response to the control function. If the timer times out before the decade counter counts out, the comparator sends a reverse control function to the controller which closes the main line valve. In this embodiment, the reset means, the comparator, the decade counter, and the timer all cooperate to act as the control function generator.

The basic building blocks of the schematic in FIGURE 2 are the NOR logic elements, often called NOR gates. A discussion of NOR logic elements is found in the "Handbook of Automation, Computation and Control, volume 3—Systems and Components," edited by Grabbe, Ramo and Wooldridge, Wylie Publishing Company, 1961, at pages 27–88 and Figure 94. Another disclosure of NOR elements appears in the August 1963 publication of Electromechanical Design, "Digital Logic Handbook—Part IV," by Paul Barr. In the latter publication, the NOR logic element is defined as follows:

"The 'NOR' gate is a device with a multiplicity of inputs and a single output. The inputs on its terminals are the true or false, enable or inhibit, one or zero binary signals. The 'NOR' gate functionally is equivalent to an 'OR' gate followed by an Inverter Amplifier (hence the term 'NOR' is a contraction of the word NOT-OR). A logical '1' input applied to either terminal of an 'NOR' gate will result in a logic '0' output. In a complementary sense, presence of a logic '0' level at each input simultaneously will result in a logic '1' output."

In addition, if one input pin is biased by a negative voltage, an output signal of "1" can be obtained if another input pin is pulsed with a positive voltage of magnitude equal to the negative voltage. The effect is as though "0" input signal was applied to all inputs.

As shown in these publications, there are multiple power inputs to each NOR element. In order to simplify the drawing and description, the multiple power input points, the various resistors, the various capacitors, and the various diodes and transistor components of each NOR element for the most part have been omitted and only the symbol and the control function are illustrated in the schematic of FIGURE 2.

NOR logic elements are available commercially and can simply be plugged into the circuit in accordance with the wiring instructions given for the particular NOR element. A preferred NOR element is described in Bulletin M-212D of the Norpak Static Control Applications Manual by Square D Company, revised February 1962.

As liquid flows through flow line 22, meter 35 registers this flow through alternate closings of contacts 35a and 35b. Closure of the contact 35a, for example, connects line 40 having a D-C voltage with converter 41. The D-C voltage may be, for example, minus 130 volts to insure positive registration of a count through contact closure. Converter 41 converts the relatively high voltage input signal via the contact 35a on meter 35 to the relatively low voltage, for example, minus 20 volts, on which the NOR logic elements operate. A suitable power converter is described in the above-cited "Handbook of Automation, Computation and Control, volume 3—Systems and Components," at pages 27–103, Figure 117.

Contact 35a remains closed until the meter closes contact 35b and opens contact 35a, and vice versa. The minus 20-volt signal, or unit signal, is applied to input pin 43 of logic element 44. The output on output pin 45 is thus driven to 0. In like manner, on the alternate closure of contact 35b, converter 47 applies a unit signal to input pin 49 of NOR element 50 and the presence of the unit signal on pin 49 drives the output pin 52 of the element 50 to 0. Pin 52 is connected to input pin 54 of NOR element 44, hence pin 54 goes to 0. Since pin 43 is at 0 because 35a has opened, pin 45 goes to 1. NOR logic elements 44 and 50 are arranged in a circuit which is analogous to a flip-flop circuit or a bistable multivibrator which is activated into one mode or the other and remains there until activated into the other mode. Registration of false counts is thus avoided through the circuit which provides a latching action such that, upon closure of contact 35a, pin 45 goes to 0 and remains at 0 until contact 35b closes independent of the condition of contact 35a. Upon closure of contact 35b, output pin 45 goes to 1 and remains at 1 until contact 35a closes. Each time a signal of 1 is impressed via pin 45 onto input pin 56 of NOR element 58, output pin 59 of the element 58 is driven to 0 and one count is registered in decade counter 60. The first count thus registered drives output pin 61 of the decade counter 60 to 1. Pin 61 is connected to input pin 62 of NOR logic element 64 and the unit signal thereon drives output pin 65 of this element to 0. Pin 65 is connected to input pin 66 of NOR element 67. Output pin 68 of this element is thus driven to 1, starting timer 69, and driving input pin 70 of the element 64 to 1, sealing pin 65 at 0 until a stop and reset signal is given by reset means 71.

If the liquid is flowing through meter 35 at a rate greater than the preset minimum rate, decade counter 60 will count out before the timer 69 times out. In this event, at the end of 9 meter pulses, the output of the decade counter 60 is such that pins 74 and 75 of the counter are both at 0. Input pins 76 and 77 of element 81 hence go to 0. This results in an output of 1 on output pin 80 of element 81. The output signal 1 on pin 80 indicates that the decade counter has run out or has counted out before the timer 69 has run out or has timed out and, hence, is a signal that the flow of liquid through meter 35 is above the preset minimum rate.

Comparator 82 monitors both the decade counter and timer. The comparator responds to the signal that the flow of liquid through meter 35 is above the preset minimum rate and generates a control function. This is done through NOR logic elements and capacitors as follows. Input pin 83 is connected to output pin 80 and hence goes to 1. Assuming output pin 84 on NOR logic element 85 is at 1, e.g., by the minus 20-volt D-C input via resistor $R_1$, the presence of a unit signal on output pin 83 forces the ouput at pin 84 to switch from 1 to 0. Such voltage change induces across capacitor 86 a positive pulse which is applied to input pin 87 of logic element 88. The pulse is sufficient to overcome the minus 20-volt bias applied to input pin 89 of element 88 and results in a unit signal on output pin 90 of element 88. The presence of a unit signal on pin 90 is a control function and is sensed by controller 39 as described in connection with operation of the controller.

The generation of the control function also bring into operation the reset means 71 whereby the timer and decade counter are reset for a subsequent comparison cycle. The stopping and resetting prevents timing out of the timer with the resulting application of conflicting signals to the controller. The reset means is brought into operation by the simultaneous application of the control function from pin 90 via line 94 to input pin 95 of logic element 96. Output pin 97 of element 96 is thus driven to 0. Input pin 98 of logic element 99 is connected to pin 97 and hence also goes to 0, causing output pin 100 of the element 99 to go to 1. This unit signal is applied to input pin 102 of element 67 and to input pin 103 of decade counter 60. The presence of the unit signal at pin 102 drives output pin 68 of logic element 67 to 0, turning off and resetting the timer 69. The presence of the unit signal at pin 103 causes the reset section 104 of the decade counter 60 to come into operation and reset the decade counter.

In the event that the flow of fluid through meter 35 is less than the preset rate at which the main line valve 26 should open, the timer 69 will time out first and a unit signal will appear on output pin 114 of timer 69. Input pin 115 of logic element 116 also receives this unit signal and drives output pin 117 of the element to 0. As previously described in connection with capacitor 86, a positive pulse is induced across capacitor 118 to input pin 119 of logic element 120. The positive pulse is sufficient to overcome the minus 20-volt bias, driving output pin 121 of the element 120 to 1. The presence of a unit signal on pin 121 is a reverse control function which will be sensed by controller 39 as described below. The reverse control function is also applied via line 125 to input pin 126 of NOR logic element 96 to trigger the reset means and result in the reset sequence described above.

In the controller 39, relay R91 is operative to close switch 132 in response to the minus 20-volt control function from pin 90. The closure of switch 132 connects actuator 135 to a suitable power source 136 to open main line valve 26. Actuator 135 may be, for example, a reversible motor and power source 136 may be a power line. Limit switch 143 disconnects actuator 135 from the power line when the main line valve is completely open. This prevents further operation of the main line valve until a valid signal is given to close the main line valve. Such a valid signal is the presence of a reverse control function from comparator 82, denoted as a unit signal on pin 121, connected to relay R152. Upon the generation of such a reverse control function, relay R152 closes switch 153, connecting a power source 137 and driving actuator 135 in the reverse direction, thus closing main line valve 26. Limit switch 154 disconnects actuator 135 from power line 137 when the main line valve 26 is completely closed. This prevents further operation until a valid signal is given to open the main line valve, i.e., the presence of a control function on pin 90 from comparator 82.

Figure 3:
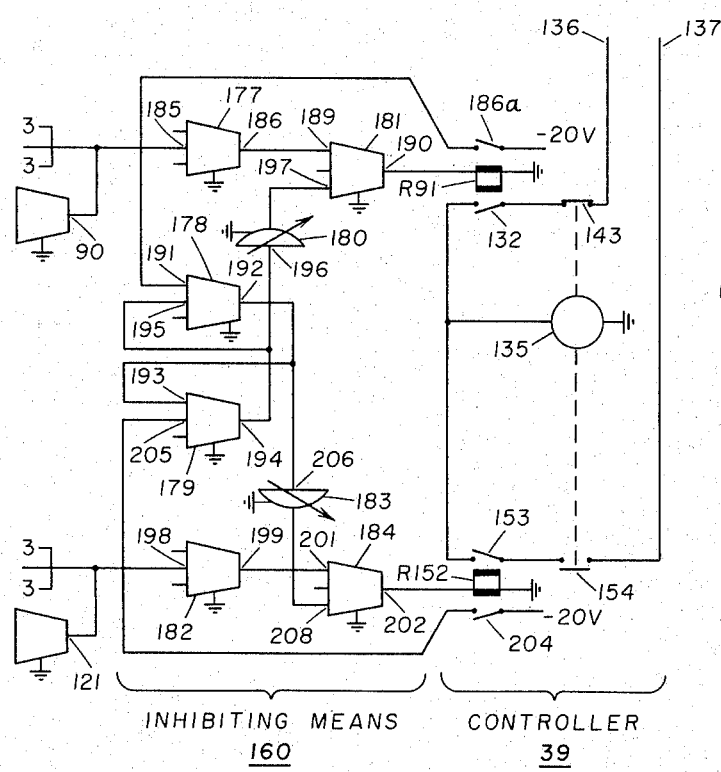
FIGURE 3 is a detailed schematic diagram of a portion of the embodiment of FIGURE 2 modified to include an inhibiting means.

Although the above-described procedure prevents opening and closing of the main line valve 26 in the absence of a valid signal for a change, an inhibiting means may be added to prevent operation of the relays R152 or R91. The addition of inhibiting means 160 at point 3—3 on FIGURE 2 is illustrated by the partial schematic of FIGURE 3. Referring to FIGURE 3, NOR logic elements 177, 178, 179, 181, 182, and 184, and timers 180 and 183 serve to inhibit excessive operation of relays R91 and R152, e.g., on each reset cycle. The inhibiting means prevents operation of the controller 39 unless the comparator 82 signals a valid change between a control function and a reverse control function. The inhibiting action is accomplished in the following manner. When a control function is present on pin 90, this control function is also applied to input pin 185 of element 177, driving output pin 186 to 0. Input pin 189 of element 181 is connected thereto and goes to 0. Output pin 190 goes to 1. The unit signal on pin 190 operates relay R91 which closes the switches 132 and 186a. Closure of switch 186a applies a minus 20 volts to input pin 191 of element 178, driving output pin 192 to 0. Input pin 193 of element 179 is connected to pin 192 and, accordingly, it also goes to 0, driving output pin 194 of element 179 to 1. This unit signal is simultaneously applied to input pin 195 of element 178 and input pin 196 of timer 180, effectively sealing element 178 in "off" condition and energizing the timer 180. After a brief time to allow positive relay operation, timer 180 times out, applying a unit signal to input pin 197 of element 181, driving output pin 190 of the element to 0 and dropping out relay R91. Switch 186a thus open and drops pin 191 to 0. Further operation of relay R91 is inhibited until element 178 is reset by operation of a reverse control function, e.g., a unit signal from pin 121, caused by the timing out of timer 69. This is one example of signaling a valid change from a control function to a reverse control function.

In the event the timer 180 times out first, the signal which results at pin 121 is used in a similar manner, described below, to inhibit element 184 from additional switching until the decade counter runs out first. This is the other example of signaling a valid change from a reverse control function to a control function. When a reverse control function is present on pin 121, it is also applied to input pin 198 of element 182, driving output pin 199 to 0. Input pin 201 of element 184 is thus driven to 0 while output pin 202 of the element is driven to 1. The presence of the unit signal on pin 202 operates relay R152.

Operation of relay R152 closes switch 153 and switch 204, applying minus 20 volts to input pin 205 of the element 179. The output pin 194 is driven to 0 as is input pin 195 of element 178. Pin 192 is driven to 1. This unit signal is simultaneously applied to pin 193 of element 179 and pin 206 of timer 183, effectively sealing element 179 in the "off" position and energizing timer 183. After a brief time to allow positive relay operations, timer 183 times out, applying a unit signal to pin 203 of element 184, driving pin 202 to 0 and dropping out relay R152. Switch 204 opens and drops pin 205 to 0. Further operation of relay R152 is inhibited until element 179 is reset by operation of a control function, e.g., a unit signal from pin 90 caused by the counting out of the decade counter 60 in FIGURE 2.

The load-carrying capacity of the NOR elements may be increased by D-C voltage inputs at points, such as shown in FIGURE 2 by resistors $R_1$, $R_2$, $R_3$, $R_4$, and $R_5$. We have found, for example, a minus 20-volt D-C input may be impressed across resistors of between 750 and 1500 ohms to afford satisfactory operation and give ample power to operate relays R91 and R152.

In the foregoing embodiment, any counter may be substituted for the decade counter, in particular a unit counter may be used and the timer 69 adjusted accordingly.

While the foregoing embodiment has been described with particularity in regard to using electrical and electronic components, it is apparent that equivalent pneumatic and mechanical instrumentation, or both, may be used to achieve the same results.

Where less accurate measuring of the fluid flowing through main flow conduit 22 can be tolerated, the instrumentation can be vastly simplified since suitable meters can measure the flow rate directly by measuring the pressure drop across an orifice plate. Under such conditions, the magnitude of the pressure drop is fed to a pressure pilot operating as a control function generator. Such pressure pilots are well known and commercially available. They may be throttling or, preferably, snap acting, i.e., either signaling full "open" or full "close." When the magnitude of the pressure drop across the orifice plate reaches a preset scalar quantity, the pressure pilot operates, applying a control function to the controller which opens the main line valve. Thus the main line valve 26 remains in the open position as long as the control function from the pressure pilot is applied to the controller. The control function is applied as long as the pressure drop across the orifice plate is greater than the preset scalar quantity, denoting a flow above a predetermined rate. When the flow falls below the predetermined rate, the pilot signals a reverse control function and the controller closes the main line valve. For example, the pressure pilot may apply pneumatic pressure to one side of a diaphragm-operated topworks, acting as controller, to open the main line valve. As a reverse control function, the pressure pilot may reduce the pneumatic pressure, allowing a spring opposing the diaphragm in the topworks, or supplying pneumatic pressure to the other side of the diaphragm if no spring is used, to close the main line valve.

Illustrative examples of suitable commercial components are given below.

Pressure relief valves which are equivalent to the one described and which may be used are, for example, the Fisher Type 7 sliding stem lever valve, wherein a weight on an external lever is used to oppose the force of the pressure of the fluid. A Fisher Type 657 back-pressure control valve, wherein a spring and a pressure-operated diaphragm are externally mounted and control the valve stem through a stuffing box, can be used, with or without a pressure pilot such as the Fisher Type 4106U pilot. The Fisher equipment is available from the Fisher Governor Company, Marshalltown, Iowa.

A Taylor differential pressure transmitter, 200TD111, available from the Taylor Instrument Co., Rochester, N.Y., is suitable for measuring and sending out a pressure signal indicative of the magnitude of the differential pressure across an orifice plate. A Fisher Type 4100 pilot can be used to translate the pressure signal into a control function or a reverse control function. A Fisher Type 667 topworks will serve as a controller to control the main line valve via a stem through a stuffing box.

Electrical components illustrated in FIGURE 2 are available commercially. In a specific embodiment of the invention, we have found the following components, purchased from the Square D Company, Milwaukee, Wis., afford satisfactory operation. The table below lists the identifications given the components in FIGURE 2 and the respective descriptions by which they may be obtained from the Square D Company.

| Component from FIGURE 2: | Description |
| --- | --- |
| Relays R91 and R152 | 8501–T020 Relay. |
| Decade Counter 60 | 8852–L12 B.C.D. Counter. |
| Timers 69, 180, and 183 | 8852–L13 Time Delay. |
| NOR Elements 85, 88, 99, 116, and 120 | 8852–L9 Univ. Pwr. NOR. |
| NOR Elements 44, 50, 58, 64, 67, 81, and 96 | 8852–L1 NOR 6 PAK. |
| Converters 41 and 47 | 8851–N5 Signal Conn. |

Capacitors 86 and 118 had a capacity of 6.8 m.f.d at 20 volts in the specific embodiment.

Having thus described our invention, it will be understood that such description has been given by way of illustration and example, and not by way of limitation, reference being had to the appended claims for that purpose.

What is claimed is:

1. A method of controlling flow of fluid in an intermittently operated flow line connecting a storage facility having a pumping means with a distant delivery point and having a normally closed main line valve comprising:
   (a) bypassing said fluid around said main line valve when the pressure upstream thereof in said flow line exceeds a preset maximum to prevent excessive pressure in said flow line and to enable fluids to flow through said flow line even when said main line valve is closed,
   (b) measuring the total rate of flow of said fluid through said flow line,
   (c) opening said main line valve when said flow of said fluid through said flow line exceeds a preset minimum rate, indicating said pumping means is operating, whereby discharge pressure on said pumping means is decreased,
   (d) stopping the bypassing of fluid when said pressure falls below said preset maximum, and
   (e) closing said main line valve when said flow of fluid decreases below said preset minimum rate, indicating said pumping means has stopped operating, whereby "bleed off" of said fluid is avoided.

2. A method of controlling flow of fluid in an intermittently operated flow line having a normally closed main line valve comprising:
  (a) bypassing fluid around said main line valve only when the pressure upstream of said main line valve exceeds a preset maximum, otherwise stopping the bypassing of fluid around said main line valve,
  (b) generating a function representing the total flow of said fluid in said flow line,
  (c) comparing said function against a time interval and generating a control function only when said function exceeds a predetermined scalar quantity within said time interval, and
  (d) opening said main line valve only in response to said control function, otherwise closing said main line valve.

3. A system for controlling an intermittently operated flow line comprising:
  (a) a main flow conduit,
  (b) a normally closed main line valve in and operable to control flow of fluid in said main flow conduit,
  (c) a bypass conduit communicating with said main flow conduit and bypassing said main line valve,
  (d) means responsive to upstream pressure to pass fluid through said bypass conduit when said upstream pressure exceeds a preset maximum,
  (e) means responsive to the total rate of flow of said fluid in said main flow conduit for generating a control function when said rate of flow is greater than a predetermined quantity per unit time, and
  (f) a controller responsive to said control function and operable to open said main line valve in response to said control function.

4. A system for controlling an intermittently operated flow line comprising:
  (a) a main flow conduit,
  (b) a normally closed main line valve in and operable to control flow of fluid in said main flow conduit,
  (c) a bypass conduit communicating with said main flow conduit and bypassing said main line valve,
  (d) a normally closed pressure relief valve in said bypass conduit responsive to upstream pressure to pass fluid through said bypass conduit when said upstream pressure exceeds a preset maximum,
  (e) mean responsive to the total rate of flow of said fluid in said main flow conduit for generating a control function when said rate of flow is greater than a predetermined quantity per unit time, and
  (f) a controller responsive to said control function and operable to open said main line valve in response to said control function.

5. A system for controlling an intermittently operated flow line comprising:
  (a) a main flow conduit,
  (b) a main line valve in and operable to control flow of fluid in said main flow conduit,
  (c) a bypass conduit communicating with said main flow conduit and bypassing said main line valve,
  (d) a normally closed pressure relief valve in said bypass conduit and responsive to upstream pressure to open only when said upstream pressure exceeds a preset maximum,
  (e) means responsive to the total rate of flow of said fluid in said main flow conduit for generating a control function when said rate of flow is greater than a predetermined quantity per unit time, and for generating a reverse control function when said rate of flow is less than said predetermined quantity per unit time, and
  (f) a controller responsive to said control function and operable to open said main line valve in response to said control function, and responsive to said reverse control function and operable to close said main line valve in response to said reverse control function.

6. A system for controlling an intermittently operated flow line comprising:
  (a) a main flow conduit,
  (b) a normally closed main line valve in and operable to control flow of fluid in said main flow conduit,
  (c) a bypass conduit communicating with said main flow conduit and bypassing said main line valve,
  (d) a normally closed pressure relief valve in said bypass conduit and responsive to upstream pressure to open only when said upstream pressure exceeds a preset maximum,
  (e) a meter capable of generating a function representative of flow through said main line valve and said pressure relief valve,
  (f) a monitor connected to said meter capable of measuring the scalar magnitude of said function and generating a signal when said function reaches a preset scalar magnitude,
  (g) a timer connected to said monitor and operable to start a timing sequence when said monitor begins to measure the scalar magnitude of said function,
  (h) a comparator connected to said monitor and said timer and capable of generating a control function when said function reaches said preset scalar magnitude before said timer times out,
  (i) a controller responsive to said control function and operable to open said main line valve in response to said control function, and
  (j) reset means connected to said comparator, said monitor, and said timer and operable to reset both said monitor and said timer upon the running out of either.

7. A system for controlling an intermittently operated flow line comprising:
  (a) a main flow conduit,
  (b) a main line valve in and operable to control flow of fluid in said main flow conduit,
  (c) a bypass conduit communicating with said main flow conduit and bypassing said main line valve,
  (d) a normally closed pressure relief valve in said bypass conduit and responsive to upstream pressure to open only when said upstream pressure exceeds a preset maximum,
  (e) a positive displacement meter in said main flow conduit connected to monitor flow through said main line valve and said pressure relief valve and connected to contacts in an electrical circuit and arranged to generate a pulse for each unit of volume flow through said meter,
  (f) a counter responsive to and capable of counting said pulses from said contacts and generating a signal when a preset number of pulses have been counted,
  (g) a timer connected to said counter and operable to start a preset timing interval when said counter starts to count and generate a signal when said preset timing interval has timed out,
  (h) a comparator capable of monitoring said timer and said counter, generating a control function when said counter counts out before said timer times out, and generating a reverse control function when said timer times out before said counter counts out,
  (i) a controller connected to said comparator, responsive thereto and operable to open said main line valve in response to said control function and to close said main line valve in response to said reverse control function, and
  (j) resetting means connected to said comparator and to said counter and said timer, and arranged to reset said counter and said timer in response to any function generated by said comparator.

8. The system of claim 7 wherein said controller contains relays responding, respectively, to said control function and said reverse control function and there is provided an inhibiting means preventing operation of said relays in said controller unless said comparator signals a valid change between said control function and said reverse control function.

9. The system of claim 7 wherein said counter is a decade counter.

10. The system of claim 7 wherein said counter is a unit counter.

11. A method of controlling flow of fluid in an intermittently operated flow line connecting a pump and associated piping with a distant delivery point comprising:
 (a) providing a large main line valve in said flow line,
 (b) providing a meter and measuring total flow of fluid through said flow line,
 (c) closing said main line valve when said flow of fluid decreases below a preset minimum rate,
 (d) providing a bypass line including a bypass valve, each being respectively smaller than said flow line and said main line valve, around said main line valve and in communication with said flow line and said meter, and opening said bypass valve to bypass fluid around said main line valve when the upstream pressure in said flow line exceeds a preset maximum,
 (e) opening said main line valve when said flow of fluid increases above a preset minimum rate, and
 (f) closing said bypass valve to stop said bypassing of said fluid when said upstream pressure falls below said preset maximum.

12. A method of controlling flow of fluid in an intermittently operated flow line comprising:
 (a) providing a large main line valve in said flow line,
 (b) measuring total flow of fluid through said flow line and generating a function representing said flow of fluid through said line, comparing said function against a time interval, and generating a reverse control function when said function is less than a predetermined scalar quantity within said time interval,
 (c) closing said main line valve in response to said reverse control function,
 (d) providing a bypass line including a bypass valve, each being respectively smaller than said flow line and said main line valve, around said main line valve and in communication with said flow line, and bypassing fluid around said main line valve when the upstream pressure in said flow line exceeds a preset maximum,
 (e) upon obtaining flow through said flow line, again comparing said function representing said flow of said fluid in said flow line against a time interval and generating a control function only when said function exceeds a predetermined scalar quantity within said time interval,
 (f) opening said main line valve in response to said control function, and
 (g) closing said bypass valve to stop said bypassing of said fluid when said upstream pressure falls below said preset maximum.

References Cited

UNITED STATES PATENTS

| | | | |
|---|---|---|---|
| 2,953,147 | 9/1960 | Hornback | 137—2 |
| 2,958,333 | 11/1960 | Poettmann | 137—8 X |
| 2,630,820 | 3/1953 | Gray | 137—110 |
| 2,643,208 | 7/1953 | Ogden | 137—110 X |

WILLIAM F. O'DEA, *Primary Examiner.*

D. J. ZOBKIW, D. DONOVAN, *Assistant Examiners.*